US011939195B2

(12) United States Patent
Nakamura et al.

(10) Patent No.: US 11,939,195 B2
(45) Date of Patent: Mar. 26, 2024

(54) OVERHEAD-LINE USING SYSTEM AND OVERHEAD-LINE MOVING DEVICE

(71) Applicant: TOYOTA JIDOSHA KABUSHIKI KAISHA, Toyota (JP)

(72) Inventors: Kazumasa Nakamura, Toyota (JP); Katsuji Harajiri, Toyota (JP); Kazuo Suyama, Suginami-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/896,224

(22) Filed: Aug. 26, 2022

(65) Prior Publication Data

US 2023/0079524 A1 Mar. 16, 2023

(30) Foreign Application Priority Data

Sep. 10, 2021 (JP) ................................ 2021-147638

(51) Int. Cl.
*B66C 21/00* (2006.01)
*B66C 21/04* (2006.01)

(52) U.S. Cl.
CPC .............. *B66C 21/00* (2013.01); *B66C 21/04* (2013.01); *B66C 2700/011* (2013.01)

(58) Field of Classification Search
CPC ......... B66C 21/00; B66C 21/02; B66C 21/04; B66C 21/06; B66C 21/08; B66C 21/10
See application file for complete search history.

(56) References Cited

U.S. PATENT DOCUMENTS

| | | | | | |
|---|---|---|---|---|---|
| 3,540,770 | A * | 11/1970 | Mitchell | B66C 21/00 | 212/87 |
| 4,127,197 | A * | 11/1978 | Dumont | B66C 21/00 | 212/122 |
| 4,164,289 | A * | 8/1979 | Haliewicz | B66C 21/04 | 212/122 |
| 4,515,281 | A * | 5/1985 | Maki | B66C 21/00 | 212/122 |
| 4,687,109 | A * | 8/1987 | Davis | B66C 21/00 | 212/331 |
| 2020/0071135 | A1* | 3/2020 | Ybarra | B66C 21/04 | |

FOREIGN PATENT DOCUMENTS

| | | | | |
|---|---|---|---|---|
| FR | 1271343 | A * | 9/1961 | B66C 21/00 |
| FR | 1400624 | A * | 5/1965 | B66C 21/00 |
| JP | 2006-15962 | A | 1/2006 | |

* cited by examiner

*Primary Examiner* — Sang K Kim
*Assistant Examiner* — Nathaniel L Adams
(74) *Attorney, Agent, or Firm* — Oblon, McClelland, Maier & Neustadt, L.L.P.

(57) ABSTRACT

An overhead-line using system includes: a plurality of supports; a main rope supported by the supports and configured such that both ends of the main rope are fixed; a work rope movably supported by the main rope; a winding device configured to wind up the work rope; a moving device movably supported by the main rope and connected to the work rope, the moving device being movable in the air when the work rope is wound up by the winding device; and a power generator configured to move along with movement of the work rope. The power generator generates electric power by moving relative to the main rope.

6 Claims, 3 Drawing Sheets

30

OVERHEAD-LINE USING SYSTEM AND OVERHEAD-LINE MOVING DEVICE

CROSS-REFERENCE TO RELATED APPLICATION

This application claims priority to Japanese Patent Application No. 2021-147638 filed on Sep. 10, 2021, incorporated herein by reference in its entirety.

BACKGROUND

1. Technical Field

The present disclosure relates to a technology that a device suspended from an overhead line is moved in the air by use of the overhead line.

2. Description of Related Art

Japanese Unexamined Patent Application Publication No. 2016-015962 (JP 2006-015962 A) describes a system including a cableway track, a movable body, a traction wire, an electric machine, and a power storage battery. The cableway track is provided on an inclined surface of a forest or the like. The movable body moves by being guided along the cableway track. The traction wire is placed along the cableway track and fixed to the movable body. The electric machine is connected to the traction wire. In the power storage battery, electric power is stored by regenerative braking of the electric machine.

SUMMARY

In an overhead-line using system, a main rope having both ends fixed to a support, and a work rope supported by the main rope are used. A device suspended from the main rope is moved by winding up or unwinding the work rope. An increase in a load applied to the work rope leads to an increase in the diameter and the weight of the work rope. This causes a device for winding the work rope to be high-powered and requires more cost.

An object of the present disclosure is to provide a technology to reduce a load to be applied to a work rope.

In order to achieve the above object, an overhead-line using system according to an aspect of the present disclosure includes a plurality of supports, a main rope, a work rope, a winding device, a moving device, and a power generator. The main rope is supported by the supports and configured such that both ends of the main rope are fixed. The work rope is movably supported by the main rope. The winding device is configured to wind up the work rope. The moving device is movably supported by the main rope and connected to the work rope. The moving device is movable in the air when the work rope is wound up by the winding device. The power generator is supported by the main rope or the moving device and configured to move along with movement of the work rope. The power generator generates electric power by moving relative to the main rope.

Another aspect of the present disclosure relates to an overhead-line moving device. The overhead-line moving device is an overhead-line moving device provided to be movable in the air by a main rope and a work rope. The main rope is configured such that both ends of the main rope are fixed. The work rope is movably supported by the main rope. The overhead-line moving device includes a moving device and a power generator. The moving device is movably supported by the main rope and connected to the work rope such that the moving device is movable with the work rope. The power generator is supported by the main rope or the moving device and configured to move along with movement of the work rope. The power generator generates electric power by moving relative to the main rope.

With the present disclosure, it is possible to provide a technology to reduce a load to be applied to a work rope.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
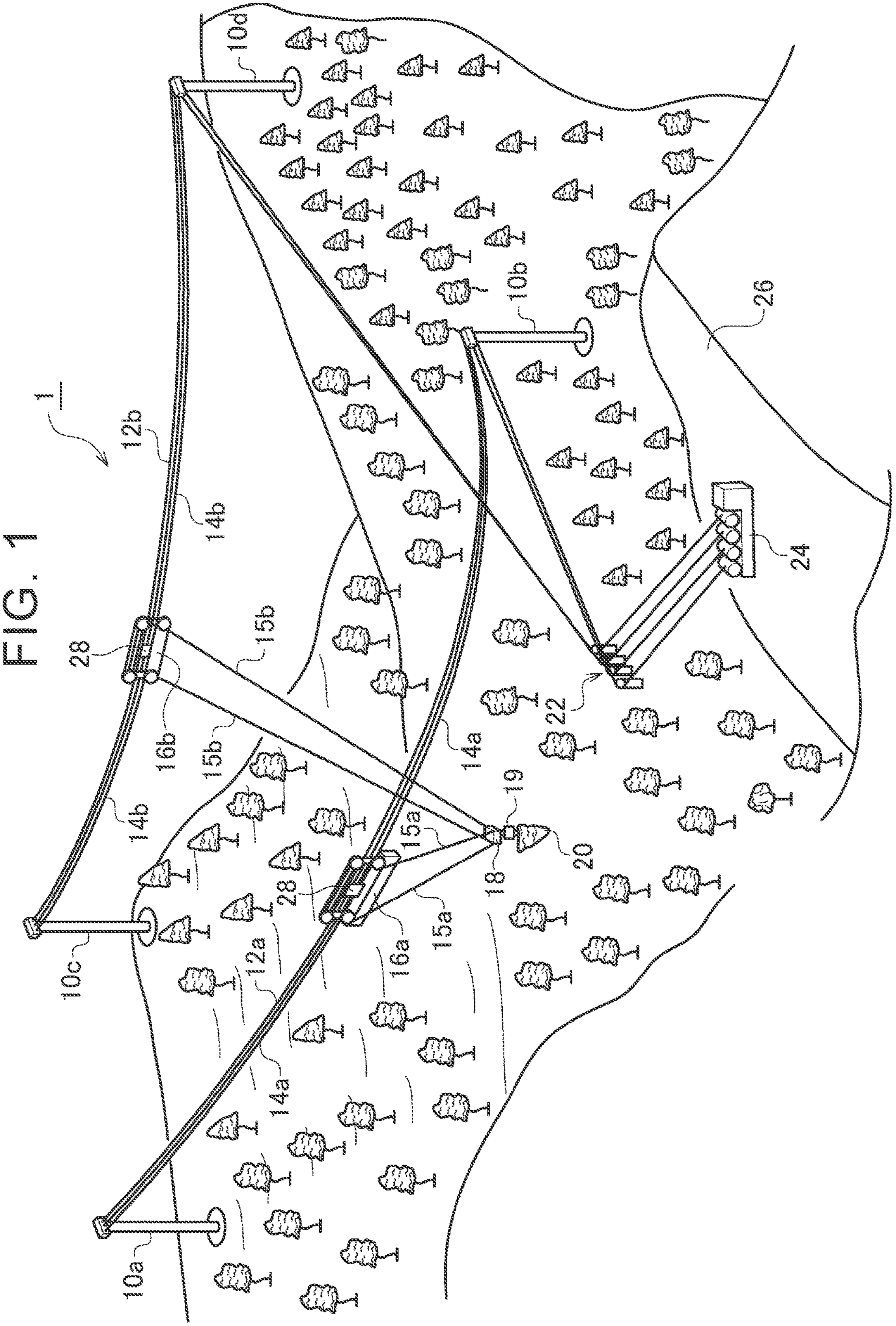
FIG. 1 is a view to describe an overhead-line using system.

FIG. 1 is a view to describe an overhead-line using system 1. The overhead-line using system 1 includes a first support 10*a*, a second support 10*b*, a third support 10*c*, a fourth support 10*d* (also just referred to as a "support 10" when they are not distinguished from each other), a first main rope 12*a*, a second main rope 12*b* (also just referred to as a "main rope 12" when they are not distinguished from each other), a first work rope 14*a*, a second work rope 14*b* (also just referred to as a "work rope 14" when they are not distinguished from each other), a first winding rope 15*a*, a fourth winding rope 15*b* (also just referred to as a "winding rope 15" when they are not distinguished from each other), a first moving device 16*a*, a second moving device 16*b* (also just referred to as a "moving device 16" when they are not distinguished from each other), a suspension device 18, a gripping device 19, a guide pulley 22, a winding device 24, and a power generator 28.

The overhead-line using system 1 is a so-called H-type overhead-line using system. The overhead-line using system 1 can lift a tree 20 cut down in a forest by use of the main rope 12, the work rope 14, and the winding rope 15 set in the air (these ropes are referred to as overhead lines) and convey the tree 20 to around a logging place 26. Hereby, the tree 20 can be conveyed from the forest without making a road.

Four supports 10 are provided in a standing manner at positions suitable for construction that are determined based on the distribution of standing trees and the position of the logging place 26. The supports 10 are set to a magnitude of around 5 meters to 10 meters in accordance with the magnitude or the like of the overhead-line using system 1.

The main ropes 12, the work ropes 14, and the winding ropes 15 are fixed to the supports 10 as the overhead lines or are put on pulleys of the supports 10. The first main rope 12*a* is fixed to the first support 10*a* and the second support 10*b*, and the second main rope 12*b* is fixed to the third support 10*c* and the fourth support 10*d*, so that the first main rope 12*a* and the second main rope 12*b* function as rails in the air. Note that, as the fixed positions of the main ropes 12, the main ropes 12 may be fixed to the ground near the supports 10 via the supports 10. The first main rope 12*a* and the second main rope 12*b* are provided so as not to intersect with each other. The length of the main rope 12 is from around 300 meters to 2000 meters.

The work rope 14 and the winding rope 15 function as running ropes to be wound up by the winding device 24 and move the moving devices 16 and the suspension device 18. The work ropes 14 are used to move the moving devices 16, and the winding ropes 15 are used to move the suspension device 18 between the main ropes 12.

The first work rope 14*a* and the second work rope 14*b* are put on pulleys provided in the supports 10. First ends of the first work rope 14*a* and the second work rope 14*b* are connected to respective moving devices 16, and second ends thereof are connected to the winding device 24. The first work rope 14*a* includes a work rope extending from the winding device 24 such that the work rope is connected to the first moving device 16*a* via the second support 10*b*, the first moving device 16*a*, and the first support 10*a*, and a work rope extending from the winding device 24 such that the work rope is connected to the first moving device 16*a* via the second support 10*b*. That is, one of the work ropes included in the first work rope 14*a* extends from the second support 10*b*, passes through the first moving device 16*a*, and then turns around the first support 10*a* such that the one of the work ropes is connected to the first moving device 16*a*.

The second work rope 14*b* includes a work rope extending from the winding device 24 such that the work rope is connected to the second moving device 16*b* via the fourth support 10*d*, the second moving device 16*b*, and the third support 10*c*, and a work rope extending from the winding device 24 such that the work rope is connected to the second moving device 16*b* via the fourth support 10*d*. That is, one of the work ropes included in the second work rope 14*b* extends from the fourth support 10*d*, passes through the second moving device 16*b*, and then turns around the third support 10*c* such that the one of the work ropes is connected to the second moving device 16*b*.

The first winding rope 15*a* extends from the winding device 24 and is fixed to the first support 10*a* via the second support 10*b*, the first moving device 16*a*, the suspension device 18, and the first moving device 16*a*. That is, after the first winding rope 15*a* extends from the second support 10*b* and bends at the first moving device 16*a*, the first winding rope 15*a* turns around the suspension device 18 and bends again at the first moving device 16*a*, and then, the first winding rope 15*a* is connected to the first support 10*a*. The fourth winding rope 15*b* extends from the winding device 24 and is fixed to the third support 10*c* via the fourth support 10*d*, the second moving device 16*b*, the suspension device 18, and the second moving device 16*b*. That is, after the fourth winding rope 15*b* extends from the fourth support 10*d* and bends at the second moving device 16*b*, the fourth winding rope 15*b* turns around the suspension device 18 and bends again at the second moving device 16*b*, and then, the fourth winding rope 15*b* is connected to the second support 10*b*.

The moving devices 16 provided as a pair are supported by the main ropes 12 provided as a pair so that the moving devices 16 are movable along the main ropes 12. The suspension device 18 is connected to the gripping device 19 via a wire for raising and lowering such that the gripping device 19 is suspended from the suspension device 18. The suspension device 18 may be provided with a position detecting device configured to detect position information on the suspension device 18 by use of a satellite positioning system. The gripping device 19 can grip a tree 20. The guide pulley 22 changes the direction of the work rope 14 put on the guide pulley 22.

The power generator 28 supplies electric power to the position detecting device provided in the moving device 16. The power generator 28 is attached to the moving device 16 such that the power generator 28 is movably suspended from the main rope 12 via the moving device 16, and the power generator 28 moves along with winding of the work rope 14.

The winding device 24 functions as a winch configured to wind up the work ropes 14 and the winding ropes 15 and include respective drums and respective drive sources for winding up or unwinding the work ropes 14 and the winding ropes 15.

The following describes the operation of the overhead-line using system 1. The winding device 24 winds up a first side of the first work rope 14*a* and unwinds a second side of the first work rope 14*a*, so that the first moving device 16*a* is moved along the first main rope 12*a*. Further, the winding device 24 winds up a first side of the second work rope 14*b* and unwinds a second side of the second work rope 14*b*, so that the second moving device 16*b* is moved along the second main rope 12*b*. Hereby, the suspension device 18 is displaced in a direction along the main ropes 12.

Next will be described the movement of the suspension device 18 in a facing direction where the first main rope 12*a* and the second main rope 12*b* face each other. When the winding device 24 winds up either one of the first winding rope 15*a* and the fourth winding rope 15*b* and unwinds the other one of the first winding rope 15*a* and the fourth winding rope 15*b*, the distance from the first moving device 16*a* to the suspension device 18 and the distance from the second moving device 16*b* to the suspension device 18 change, so that the suspension device 18 is displaced between the first moving device 16*a* and the second moving device 16*b*. By combining winding and unwinding of the work ropes 14 and the winding ropes 15 as such, the suspension device 18 can move horizontally in a region surrounded by the four supports 10.

Note that, in the configuration of the overhead-line using system 1 illustrated in FIG. 1, the work ropes 14 and the winding ropes 15 are collectively wound up by the winding device 24, but the embodiment is not limited to this configuration. For example, each of the supports 10 may be provided with a winding device configured to wind up one work rope 14. Hereby, it is not necessary for the work rope 14 to be turned and extended to the winding device 24. Accordingly, it is possible to shorten the whole length of the work rope 14, thereby making it possible to reduce a load to be applied to the support 10. Further, respective winding devices may be provided near the third support 10*c* and the fourth support 10*d*. Thus, the winding device may be an integrated winding device or may be separate winding devices. Further, the arrangement of the overhead lines is not limited to this configuration. The work ropes 14 and the winding ropes 15 can be used in common, or the number of the work ropes 14 and the number of the winding ropes 15 may be six or may be four.

Since the power generator 28 is supported by the first main rope 12*a*, it is possible to avoid the suspension device 18 from bearing the load of the power generator 28, thereby making it possible to reduce a load to be applied to the work rope 14. The power generator 28 supplies electric power to the position detecting device provided in the moving device 16.

A control device (not illustrated) that can remotely control the winding device 24, the suspension device 18, and the gripping device 19 is provided in a control room. The moving devices 16, the winding device 24, the suspension device 18, and the gripping device 19 can communicate with the control device. The control device is provided with an input portion such as a touch panel or a mechanical controller that receives an operation performed by an operator. A control by which the moving devices 16 and the suspension device 18 are moved, a control by which the gripping device 19 is moved down, and a control by which the tree 20 is gripped may be executed by programs provided in advance or may be executed such that the operator operates the control device. Further, a control on the overhead-line using system 1 may be executed by a combination of a program and an operation performed by the operator. For example, a control by which the moving devices 16 and the suspension device 18 are moved to a target position may be executed by a program, and a control by which the gripping device 19 is moved down to grip the tree 20 may be executed by an operation performed by the operator. For example, the operator executes the controls while the operator observes images transmitted from cameras provided in the suspension device 18, the gripping device 19, and so on.

Figure 2:
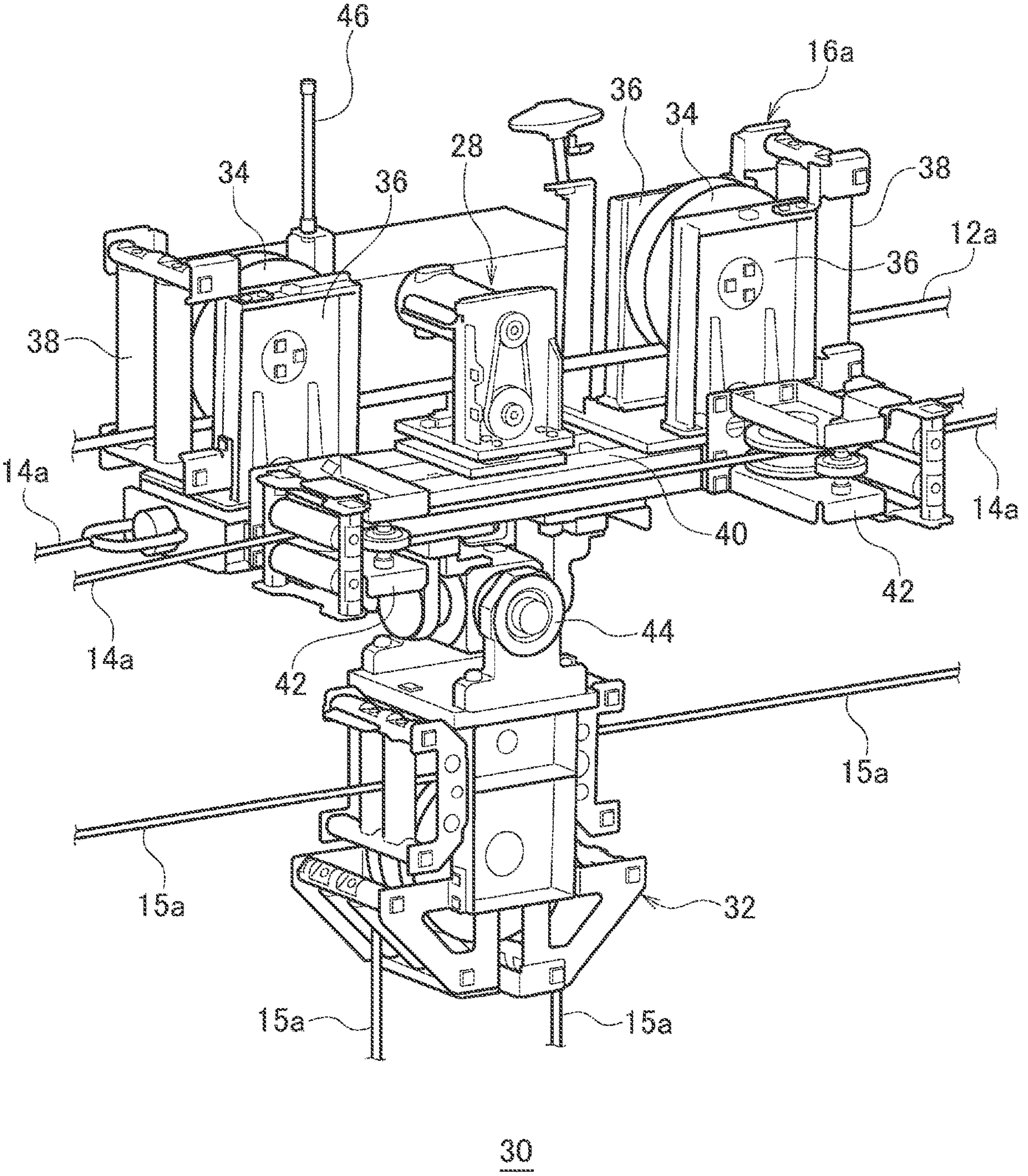
FIG. 2 is a perspective view of an overhead-line moving device in a state where the overhead-line moving device is attached to the overhead-line using system.

FIG. 2 is a perspective view of an overhead-line moving device 30 in a state where the overhead-line moving device 30 is attached to the overhead-line using system 1. The overhead-line moving device 30 includes the first moving device 16*a*, the power generator 28, and a hanging device 32. The first moving device 16*a* includes a main-rope pulley 34, a support wall portion 36, a restriction roller 38, a frame 40, and a work-rope connecting portion 42. The frame 40 has a flat-shaped seating face extending generally horizontally.

A pair of main-rope pulleys 34 is provided such that the main-rope pulleys 34 engage with the first main rope 12*a* from the upper side of the first main rope 12*a*. A pair of support wall portions 36 is provided for each of the main-rope pulleys 34 in a standing manner from the frame 40 such that the each of the main-rope pulleys 34 is sandwiched between the support wall portions 36. The support wall portions 36 pivotally support the each of the main-rope pulleys 34 in a rotatable manner. Since the support wall portions 36 are placed to sandwich the each of the main-rope pulleys 34, it is possible to restrain vibration of the shaft of the each of the main-rope pulleys 34. Since the main-rope pulleys 34 engage with the first main rope 12*a* from its upper side, the load of the first moving device 16*a* can be applied to the first main rope 12*a* without being applied to the first work rope 14*a*.

The restriction roller 38 includes a pair of rollers provided such that the first main rope 12*a* is sandwiched between the rollers, and hereby, the restriction roller 38 guides the first main rope 12*a* to the main-rope pulley 34. The restriction roller 38 is provided in a standing manner from the frame 40 and restricts the movement of the main-rope pulley 34 in its rotation-axis direction by the first main rope 12*a*. Due to the restriction roller 38, the first main rope 12*a* cannot easily come off from a groove of the main-rope pulley 34. The restriction roller 38 is placed outside each of the main-rope pulleys 34 in a direction along the first main rope 12*a*.

The work-rope connecting portion 42 overhangs from the frame 40 in the rotation-axis direction of the main-rope pulley 34 such that the work-rope connecting portion 42 is connected to the first work rope 14*a*. The work-rope connecting portion 42 receives an input from the first work rope 14*a* in response to winding of the first work rope 14*a* by the winding device 24.

The hanging device 32 engages with the first winding rope 15*a* such that the hanging device 32 changes the first winding rope 15*a* from the direction along the first main rope 12*a* to a direction perpendicular to the first main rope 12*a*. The hanging device 32 includes a joint portion 44 connected to the frame 40. The joint portion 44 allows the hanging device 32 to swing in two directions.

The position detecting device 46 is attached to the frame 40 of the first moving device 16*a* and acquires position information on the first moving device 16*a* by use of a satellite positioning system such as a global positioning system (GPS). The position detecting device 46 transmits the position information on the first moving device 16*a* to the control device of the overhead-line using system 1. When the position information on the first moving device 16*a* is transmitted, the first moving device 16*a* can be moved with accuracy.

Figure 3:
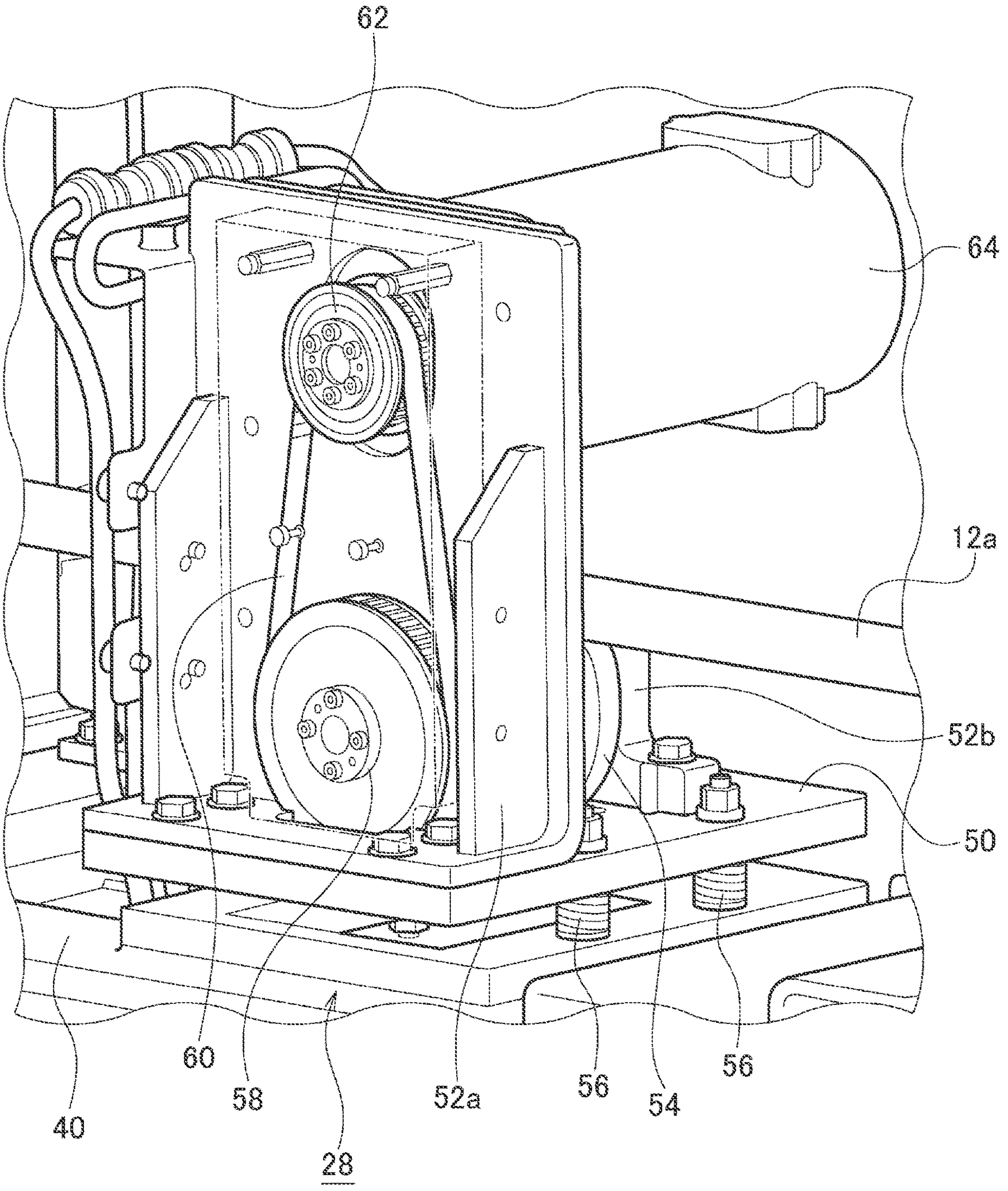
FIG. 3 is a perspective view of a power generator in an attached state.

The power generator 28 is placed between the main-rope pulleys 34 and is put on the frame 40. The power generator 28 has a power generation function and a power storage function. The main-rope pulleys 34 are provided at a given interval to maintain the first moving device 16*a* in a stable posture. When the power generator 28 is placed in a space between the main-rope pulleys 34, it is possible to restrain upsizing of the first moving device 16*a*. Further, since the power generator 28 is put on the frame 40 of the first moving device 16*a*, the load of the power generator 28 is applied to the first main rope 12*a*. In a case where the first work rope 14*a* is made thick to endure high tensile force, additional processes of making the supports 10 larger and increasing the output of the winding device 24 are required, so that the cost of the overhead-line using system 1 increases. Since the power generator 28 is provided without increasing the load to be applied to the first work rope 14*a*, it is possible to restrain an increase in tensile force of the winding device 24. FIG. 3 is a perspective view of the power generator 28 in an attached state.

The power generator 28 includes a pedestal portion 50, a first support wall portion 52*a*, a second support wall portion 52*b*, a rotating body 54, a spring portions 56, a first gear 58, a belt 60, a second gear 62, and a generator 64.

The pedestal portion 50 is placed on the frame 40 via a plurality of spring portions 56. The spring portions 56 are coil springs, for example. The spring portions 56 are provided between the pedestal portion 50 and the frame 40 and bias the pedestal portion 50 upward.

The first support wall portion 52*a* and the second support wall portion 52*b* are provided in a standing manner from the pedestal portion 50 such that the first support wall portion 52*a* and the second support wall portion 52*b* face each other and support the rotating body 54. The rotating body 54 is rotatably supported by the first support wall portion 52*a* and the second support wall portion 52*b* and engages with the first main rope 12*a* from its lower side. The rotating body 54 is pressed against the first main rope 12*a* from its lower side by the spring portions 56. Hereby, the engagement between the rotating body 54 and the first main rope 12*a* is maintained.

The first gear 58 is rotatably supported by the first support wall portion 52*a* and is fixed to the rotating shaft of the rotating body 54 such that the first gear 58 rotates with the rotating body 54. The second gear 62 is rotatably supported by the first support wall portion 52*a* and is placed above the first gear 58. Rotation is input into the generator 64 via the second gear 62. The second gear 62 has a diameter smaller than that of the first gear 58.

The belt 60 meshes with the first gear 58 and the second gear 62 and transmits the rotation of the first gear 58 to the second gear 62. The generator 64 generates electric power based on the rotation of the second gear 62. The generator 64 also includes a storage battery in which the generated electric power is stored. The generator 64 supplies the generated electric power to the position detecting device 46. Hereby, it is not necessary to lead an electric wire to the first moving device 16*a*. As a result, a device for winding an electric wire with a length of 1000 meters is unnecessary, and further, there is no risk of disconnection of the electric wire.

When the first moving device 16*a* moves relative to the first main rope 12*a*, the rotating body 54 rotates in accordance with the moving distance of the first moving device 16*a*. The rotation of the rotating body 54 is input into the generator 64 via the first gear 58, the belt 60, and the second gear 62, so that the generator 64 generates electric power. That is, the generator 64 generates electric power in accordance with the moving distance of the first moving device 16*a*. Note that the second moving device 16*b* and the power generator 28 also have configurations similar to that of the first moving device 16*a*.

The present disclosure has been described above based on the embodiment. The embodiment is just an example, and it is understood by a person skilled in the art that various modifications can be made in terms of combinations of the constituents and the processes and such modifications are also included in the scope of the present disclosure.

In the embodiment, the gripping device 19 is configured to grip a tree, but the embodiment is not limited to this configuration. For example, an inspection device for detecting the state of a tree may be suspended from the suspension device 18. Further, a cutting device for cutting a tree may be suspended from the suspension device 18. Thus, a working device to be suspended from the suspension device is not limited to the gripping device 19. The working device is a device for executing a predetermined operation and is changeable depending on purposes.

Further, in the embodiment, the power generator 28 is supported by the moving device 16, but the embodiment is not limited to this configuration. The power generator 28 may be directly supported by the main rope 12. For example, the power generator 28 may be suspended from a pulley provided above the main rope 12 and regenerate electric power based on the rotative motion of the pulley. In any case, the power generator 28 is provided such that its load is applied to the main rope 12.

What is claimed is:

1. An overhead-line moving device provided to be movable in air by a main rope and a work rope, the main rope being configured such that both ends of the main rope are fixed, the work rope being movably supported by the main rope, the overhead-line moving device comprising:

a moving device movably supported by the main rope and connected to the work rope such that the moving device is movable with the work rope; and a power generator supported by the main rope or the moving device and configured to move along with movement of the work rope, wherein the power generator generates electric power by moving relative to the main rope, wherein the power generator includes a rotating body configured to rotatably engage with the main rope, a generator configured to generate electric power based on rotation of the rotating body, and a spring portion configured to bias the rotating body and the generator toward the main rope;

the moving device includes a pair of main-rope pulleys, the pair of main-rope pulleys being configured to rotatably engage with the main rope, and a frame connected to the pair of main-rope pulleys;

the rotating body and the spring portion are between the pair of main-rope pulleys; and the power generator is on an upper surface of the frame.

2. The overhead-line using device according to claim 1, wherein:

the power generator includes a pedestal; and the spring portion is between the upper surface of the frame and the pedestal to bias the power generator upward.

3. The overhead-line using device according to claim 1, wherein:

the pair of main-rope pulleys are configured to engage with an upper side of the main rope.

4. An overhead-line using system comprising:

a plurality of supports;

a main rope supported by the supports and configured such that both ends of the main rope are fixed;

a work rope movably supported by the main rope;

a winch configured to wind up the work rope;

a moving device movably supported by the main rope and connected to the work rope, the moving device being movable in air when the work rope is wound up by the winch; and a power generator supported by the main rope or the moving device and configured to move along with movement of the work rope, wherein the power generator generates electric power by moving relative to the main rope, wherein the power generator includes a rotating body configured to rotatably engage with the main rope, a generator configured to generate electric power based on rotation of the rotating body, and a spring portion configured to bias the rotating body and the generator toward the main rope;

the moving device includes a pair of main-rope pulleys, the main-rope pulleys being configured to rotatably engage with the main rope, and a frame connected to the main-rope pulleys;

the rotating body and the spring portion are between the main-rope pulleys; and the power generator is on an upper surface of the frame.

5. The overhead-line using system according to claim 4, wherein:

the power generator includes a pedestal; and the spring portion is between the upper surface of the frame and the pedestal to bias the power generator upward.

6. The overhead-line using system according to claim 4, wherein:

the pair of main-rope pulleys are configured to engage with an upper side of the main rope.

* * * * *